United States Patent
Koehler et al.

(10) Patent No.: US 12,134,400 B2
(45) Date of Patent: *Nov. 5, 2024

(54) REFERENCE TRACKING FOR TWO AUTONOMOUS DRIVING MODES USING ONE CONTROL SCHEME

(71) Applicant: TOYOTA RESEARCH INSTITUTE, INC., Los Altos, CA (US)

(72) Inventors: Sarah Koehler, Sunnyvale, CA (US); Carrie Bobier-Tiu, Sunnyvale, CA (US); Matthew Brown, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 17/474,019

(22) Filed: Sep. 13, 2021

(65) Prior Publication Data
US 2023/0084461 A1    Mar. 16, 2023

(51) Int. Cl.
*B60W 60/00* (2020.01)
*B60W 10/20* (2006.01)
*B60W 30/12* (2020.01)
*B60W 50/08* (2020.01)
*B60W 50/10* (2012.01)

(52) U.S. Cl.
CPC .......... *B60W 60/001* (2020.02); *B60W 10/20* (2013.01); *B60W 30/12* (2013.01); *B60W 50/087* (2013.01); *B60W 50/10* (2013.01); *B60W 60/0053* (2020.02); *B60W 2510/20* (2013.01); *B60W 2710/20* (2013.01); *B60W 2720/24* (2013.01)

(58) Field of Classification Search
None
See application file for complete search history.

(56) References Cited

U.S. PATENT DOCUMENTS

| | | |
|---|---|---|
| 8,437,890 B2 | 5/2013 | Anderson |
| 9,545,995 B1 | 1/2017 | Chau |
| 9,645,575 B2 | 5/2017 | Watson |
| 10,737,717 B2 | 8/2020 | Peng |
| 2018/0231972 A1 | 8/2018 | Woon |
| 2019/0009794 A1 | 1/2019 | Toyoda |
| 2019/0265714 A1 | 8/2019 | Ball |
| 2020/0216085 A1 | 7/2020 | Bobier-Tiu |
| 2021/0053582 A1 | 2/2021 | Bobier-Tiu |
| 2021/0096576 A1 | 4/2021 | Grigorescu |
| 2023/0020503 A1 * | 1/2023 | Rahman ............... G05D 1/0221 |
| 2023/0049927 A1 * | 2/2023 | Engel .................. B60W 60/005 |

OTHER PUBLICATIONS

Massera et al. "Tube-based Guaranteed Cost Model Predictive Control Applied to Autonomous Driving up To Limits of Handling", Dec. 9, 2020, 8 pages.

* cited by examiner

*Primary Examiner* — Christian Chace
*Assistant Examiner* — Katherine Marie Fitzharris
(74) *Attorney, Agent, or Firm* — SHEPPARD, MULLIN, RICHTER & HAMPTON LLP; Daniel N. Yannuzzi

(57) ABSTRACT

Systems and methods of using a common control scheme to autonomously controlling a vehicle during semi-autonomous and fully autonomous driving modes are provided. In particular, embodiments of the presently disclosed technology incorporate reference tracking for driving input and vehicle state into this common control scheme. In some embodiments, this common control scheme may be implemented using Model Predictive Control (MPC).

20 Claims, 5 Drawing Sheets

REFERENCE TRACKING FOR TWO AUTONOMOUS DRIVING MODES USING ONE CONTROL SCHEME

TECHNICAL FIELD

The present disclosure relates generally to automotive systems and technologies, and more particularly, some embodiments relate to reference tracking while a vehicle is operating in fully autonomous and semi-autonomous driving modes.

DESCRIPTION OF RELATED ART

Some vehicles may operate in either a semi-autonomous mode (i.e. a driver-in-the-loop mode) or fully autonomous driving mode. In a semi-autonomous mode, an autonomous driving system in a vehicle may support a human driver who is providing driving inputs. For example, a driver may be actively performing any of a steering operation, an acceleration operation, and a brake operation of the vehicle, while an autonomous control system performs some subset of one or more of those operations, e.g., in an assistive, complementary, or corrective manner. By contrast, in a fully autonomous mode, the autonomous driving system is in complete control of driving without human driver input.

BRIEF SUMMARY OF THE DISCLOSURE

According to various embodiments of the disclosed technology a vehicle having a semi-autonomous and a fully autonomous driving mode is provided. The vehicle comprises an electronic control unit (ECU) including machine executable instructions in non-transitory memory to: (1) in response to receiving a driving input and a vehicle state for a defined time horizon, determine a reference driving input and a reference vehicle state for the defined time horizon, wherein the driving input is a human driver input when the vehicle is operating in a semi-autonomous mode and a pseudo-driver input when the vehicle is operating in a fully autonomous mode; (2) compare the driving input and the reference driving input to an autonomous driving command and the reference vehicle state to the vehicle state; (3) refine the autonomous driving command; and (4) generate a control signal which effectuates the refined autonomous driving command. In some embodiments, comparing the reference driving input to the autonomous driving command may comprise comparing the reference driving input to the autonomous driving command within a first term of an objective cost function. In these embodiments, comparing the driving input to the autonomous driving command may comprise comparing the driving input to the autonomous driving command within a second term of the objective cost function, and comparing the reference vehicle state to the vehicle state may comprise comparing the reference vehicle state to the vehicle state within a third term of the objective cost function. Accordingly, refining the autonomous driving command may comprise computing an autonomous driving command which reduces the objective cost function.

In various embodiments, a method for controlling a vehicle having a semi-autonomous mode and a fully autonomous mode is provided. The method may comprise (1) in response to receiving a driving input and a vehicle state for a defined time horizon, determining a reference driving input and a reference vehicle state for the defined time horizon, wherein the driving input is a human driver input when the vehicle is operating in a semi-autonomous mode and a pseudo-driver input when the vehicle is operating in a fully autonomous mode; (2) comparing the reference driving input to an autonomous driving command and the reference vehicle state to the vehicle state; (3) refining the autonomous driving command; and (4) generating a control signal which effectuates the refined autonomous driving command. In some embodiments, comparing the reference driving input to the autonomous driving command may comprise comparing the reference driving input to the autonomous driving command within a first term of an objective cost function. In these embodiments, comparing the reference vehicle state to the vehicle state may comprise comparing the reference vehicle state to the vehicle state within a second term of the objective cost function. Accordingly, refining the autonomous driving command may comprise computing an autonomous driving command which reduces the objective cost function. In certain embodiments, the reference driver input may be the human driver input when the vehicle is in the semi-autonomous mode.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
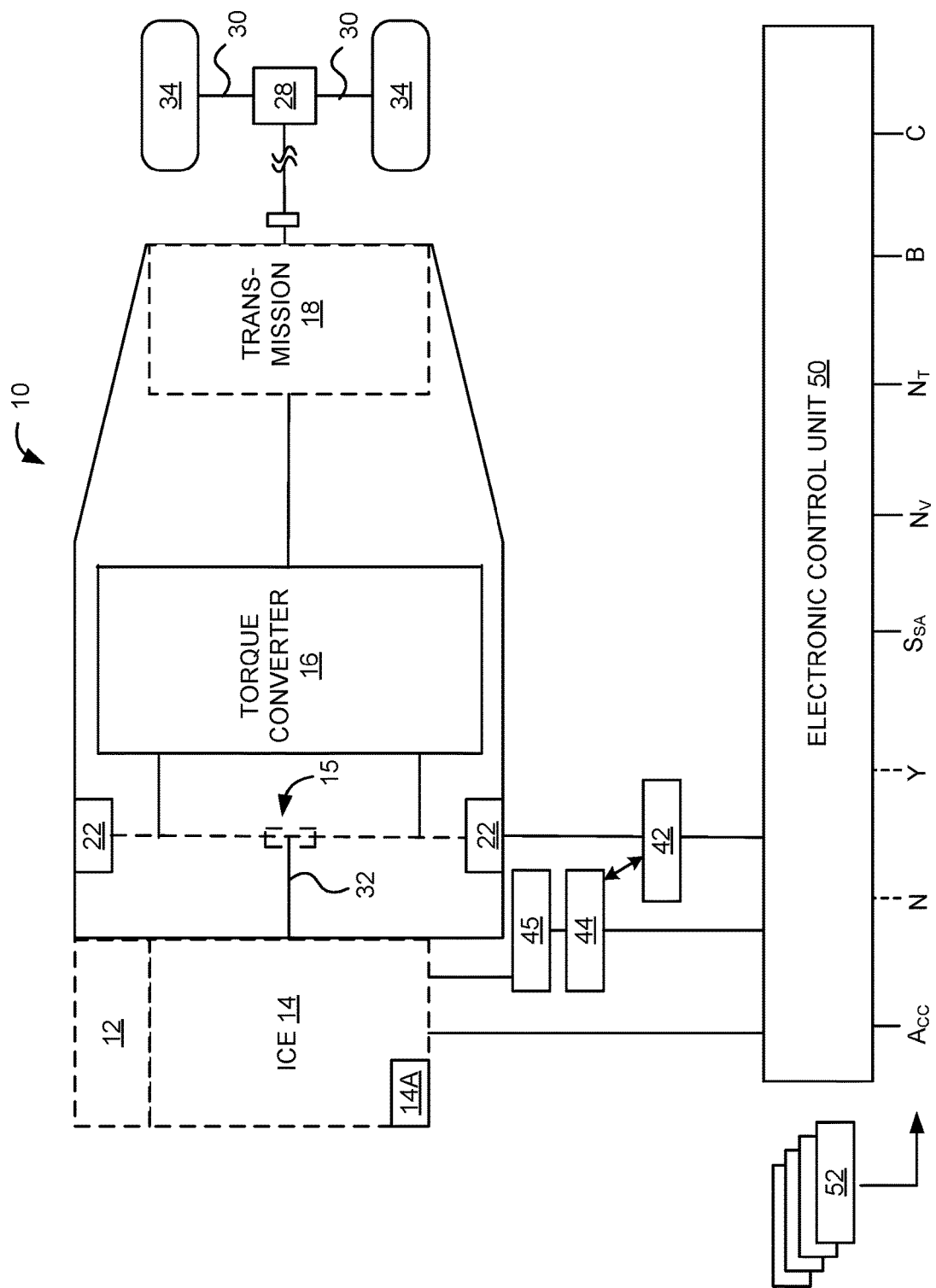
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As alluded to above, some vehicles may operate in either a semi-autonomous or a fully autonomous driving mode. In the semi-autonomous driving mode, an autonomous driving system may receive inputs from a human driver which may indicate the driver's desired path of travel. Accordingly, based on the received driving inputs, the autonomous driving system may selectively provide corrective assistance. For example, the autonomous driving system may provide steering corrections to maintain a vehicle in the center of a lane. In other examples, the autonomous driving system may apply automatic braking in order to avoid/mitigate a collision. In a fully autonomous mode, the autonomous driving system has complete control over driving, without human driver input. Here, the autonomous driving system must determine/execute driving commands which track a desired trajectory.

Whether operating in a semi-autonomous mode or a fully autonomous mode, an autonomous driving system may utilize an algorithm-based control scheme in order to control a vehicle. This algorithm-based control scheme may be formulated as an optimization problem (i.e. a mathematical problem of finding the best solution from all feasible solutions). For example, an autonomous driving system may determine an optimal autonomous driving command by minimizing an objective cost function involving variables such as driving input and vehicle state. Here, the optimal autonomous driving command may be the autonomous driving command which minimizes the objective cost function.

Few current technologies utilize a common control scheme for the semi-autonomous and fully autonomous driving modes. In part, this is because the two driving modes involve different inputs, and by extension, different objectives. A conventional autonomous driving system will only receive/respond to driving inputs provided by a human driver while in the semi-autonomous mode. Here, its objective will be to modify the human driver input/command, to for example, keep the human driver safe. By contrast, the autonomous driving system's objective in a fully autonomous mode may be to determine a driving command which tracks a desired trajectory.

Against this backdrop, embodiments of the technology disclosed herein are directed towards systems and methods of using a common control scheme to autonomously control a vehicle during the semi-autonomous and fully autonomous driving modes. In particular, embodiments of the presently disclosed technology incorporate reference tracking of driving input and vehicle state into this common control scheme. In some embodiments, this common control scheme may be implemented using Model Predictive Control (MPC).

Embodiments of the presently disclosed technology are able to use a common control scheme for the semi-autonomous and fully autonomous driving modes by introducing the concept of a pseudo-driver. During typical operation in a semi-autonomous driving mode, an autonomous driving system receives inputs from a human driver which may indicate a desired path of travel. Based on these human driver inputs, the autonomous driving system may motively control/navigate the vehicle. However, as alluded to above, during typical operation in a fully autonomous driving mode, the autonomous driving system will not receive driving inputs from a human driver. Accordingly, embodiments of the presently disclosed technology replace human driver inputs with "pseudo-driver inputs." In particular, during operation in a fully-autonomous driving mode, a pseudo-driver (which may be an electronic control unit in the vehicle), may provide the same/similar inputs as a human driver would in the semi-autonomous driving mode. In this way, the two driving modes share a common input format, and are thus able to utilize common control algorithms designed around that input format.

Accordingly, embodiments of the presently disclosed technology may operate more efficiently than autonomous driving systems which utilize separate control schemes for the semi-autonomous and fully autonomous driving modes. For example, embodiments of the presently disclosed technology may not require a shut down and switch of control systems when, for example, a driver of a vehicle decides to switch from a semi-autonomous driving mode to a fully autonomous driving mode. In addition, embodiments of the presently disclosed technology may require less hardware to operate than autonomous driving systems which require separate control schemes for semi-autonomous and fully autonomous driving. For example, most conventional technologies are built with separate hardware systems (e.g. separate ECUs, separate communication hardware, etc.) for semi-autonomous driving and autonomous driving. Thus, embodiments of the presently disclosed technology may reduce the number of hardware systems included in an autonomous driving system.

As alluded to above, embodiments of the presently disclosed technology integrate reference tracking into a common scheme for controlling a vehicle in the semi-autonomous and fully autonomous modes. Reference tracking may generally refer to the use of comparisons between the current states of a system (e.g. current driving inputs and vehicle states) and the desired outputs of the system (e.g. reference driving inputs and reference vehicle states) in order to influence/refine a controller output/decision. In some embodiments, reference tracking may also include the use of comparisons between predicted states of a system (e.g. predicted driver inputs and predicted vehicle states) and the desired outputs of the system in order to influence/refine the controller output/decision. For example, in accordance with various embodiments, an autonomous driving system may compare current and predicted vehicle states for a defined time horizon, to reference vehicle states. In addition, current and predicted autonomous driving commands may be compared to reference driving inputs. Based on these comparisons, the autonomous driving system may refine the autonomous driving commands it determines to take.

In certain embodiments, an autonomous driving system may receive a driving input (a human driver input while operating in a semi-autonomous mode and a pseudo-driver input while operating in a fully autonomous mode) and a vehicle state for a defined time horizon. In response, the autonomous driving system may determine a reference driving input and a reference vehicle state for the defined time horizon. In turn, these reference values may be compared to an autonomous driving command and the vehicle state respectively. Based in part on these comparisons, the autonomous driving command may be refined. Accordingly, the autonomous driving system may generate a control signal which effectuates the refined autonomous driving command. In this way, reference tracking may be used to refine the autonomous driving command an autonomous driving system decides/determines to take.

Through reference tracking, embodiments of the presently disclosed technology improve the tracking performance and stability of an autonomous driving system. As alluded to above, embodiments of the presently disclosed technology are able to refine autonomous driving commands by comparing desired/reference vehicle states and autonomous driving commands to current/predicted vehicle states and autonomous driving commands. Accordingly, embodiments of the disclosed technology are more robust than other control systems, allowing them to account for external disturbances such as uncertain road conditions (e.g. changes in friction, bank, grade, curvature, etc.) and changing vehicle properties (e.g. tire cornering stiffness, weight distribution, etc.).

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for autonomously controlling a vehicle having semi-autonomous and fully autonomous modes, can be implemented in other types of vehicle including gasoline- or diesel-powered vehicles, fuel-cell vehicles, electric vehicles, or other vehicles.

FIG. 1 illustrates a drive system of a vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16 and/or clutch 15, a transmission 18, a differential gear device 28, and a pair of axles 30.

As an HEV, vehicle 10 may be driven/powered with either or both of internal combustion engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses internal combustion engine 14 and the motor(s) 22 as the sources of motive power. In the engine-only and HEV travel modes, vehicle 10 relies on the motive force generated at least by internal combustion engine 14, and a clutch 15 may be included to engage internal combustion engine 14. In the EV travel mode, vehicle 10 is powered by the motive force generated by motor 22 while internal combustion engine 14 may be stopped and clutch 15 disengaged.

Internal combustion engine 14 can be an internal combustion engine such as a gasoline, diesel or similarly powered engine in which fuel is injected into and combusted in a combustion chamber. A cooling system 12 can be provided to cool the internal combustion engine 14 such as, for example, by removing excess heat from internal combustion engine 14. For example, cooling system 12 can be implemented to include a radiator, a water pump and a series of cooling channels. In operation, the water pump circulates coolant through the internal combustion engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of internal combustion engine 14. In other applications, either or both the water pump and the fan may be operated by electric current such as from battery 44.

An output control circuit 14A may be provided to control drive (output torque) of internal combustion engine 14. Output control circuit 14A may include a throttle actuator to control an electronic throttle valve that controls fuel injection, an ignition device that controls ignition timing, and the like. Output control circuit 14A may execute output control of internal combustion engine 14 according to a command control signal(s) supplied from an electronic control unit 50, described below. Such output control can include, for example, throttle control, fuel injection control, and ignition timing control. Throttle commands from a driver of vehicle 10 may be communicated by wire to electronic control unit 50 via an accelerator pedal position sensor attached to the accelerator pedal (not pictured). The accelerator pedal position sensor may be one of sensors 52, described below. As will be described in greater detail below, these throttle commands from a human driver in vehicle 10 may be one or more of the human driver commands which comprise a human driver input.

Motor 22 can also be used to provide motive power in vehicle 10 and may be powered electrically via a battery 44. More specifically, motor 22 can be powered by battery 44 to generate motive force to move the vehicle and adjust vehicle speed. Motor 22 can also function as a generator to generate electrical power such as, when coasting or braking. Motor 22 may be connected to battery 44 via an inverter 42. Battery 44 may also be used to power other electrical or electronic systems in the vehicle. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from internal combustion engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage internal combustion engine 14 from the drivetrain of the vehicle. In the illustrated example, a crankshaft 32, which is an output member of internal combustion engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from internal combustion engine 14 is not delivered to the torque converter 16. In a slip engagement state, clutch 15 is engaged, and motive power is provided to torque converter 16 according to a torque capacity (transmission torque) of the clutch 15.

Vehicle 10 may also include a steering-by-wire system (not pictured). In this system, a steering actuator may control the direction of wheels 34. Electronic control unit 50 may control the steering actuator. Steering commands/lateral force commands may be communicated from the driver of vehicle 10 to electronic control unit 50 via a steering angle sensor positioned on the steering wheel of vehicle 10. As will be described in greater detail below, these lateral force commands may be one or more of the human driver commands which comprise a human driver input.

Vehicle 10 may further include a brake-by-wire system (not pictured). In this system, one or more brake actuators may control the application of brakes to wheels 34. Electronic control unit 50 may control the brake actuator(s). Braking commands may be communicated from the driver of vehicle 10 to electronic control unit 50 via a brake pedal position sensor positioned on the brake pedal of vehicle 10. As will be described in greater detail below, these braking commands may be one or more of the human driver commands which comprise a human driver input.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an autonomous driving module, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, N, of internal combustion engine 14 (engine RPM), yaw rate of the vehicle, Y (e.g. the angular velocity of the vehicle around its yaw axis), sideslip angle of the vehicle, $S_{SA}$ (e.g. the angle between the direction the vehicle is pointing and the vehicle's linear velocity vector), and vehicle speed, $N_V$. These may also include torque converter 16 output, $N_T$ (e.g., output amps indicative of motor output), and brake operation amount/pressure, B. Accordingly, vehicle 10 can include a plurality of sensors 52 that can be used to detect various conditions internal or external to the vehicle and provide sensed conditions to engine control unit 50 (which, again, may be implemented as one or a plurality of individual control circuits).

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

As will be described in greater detail below, data obtained from/computed by sensors 52 may be used to predict future vehicle states, future human driver commands, and current and future pseudo-driver commands.

Figure 2:
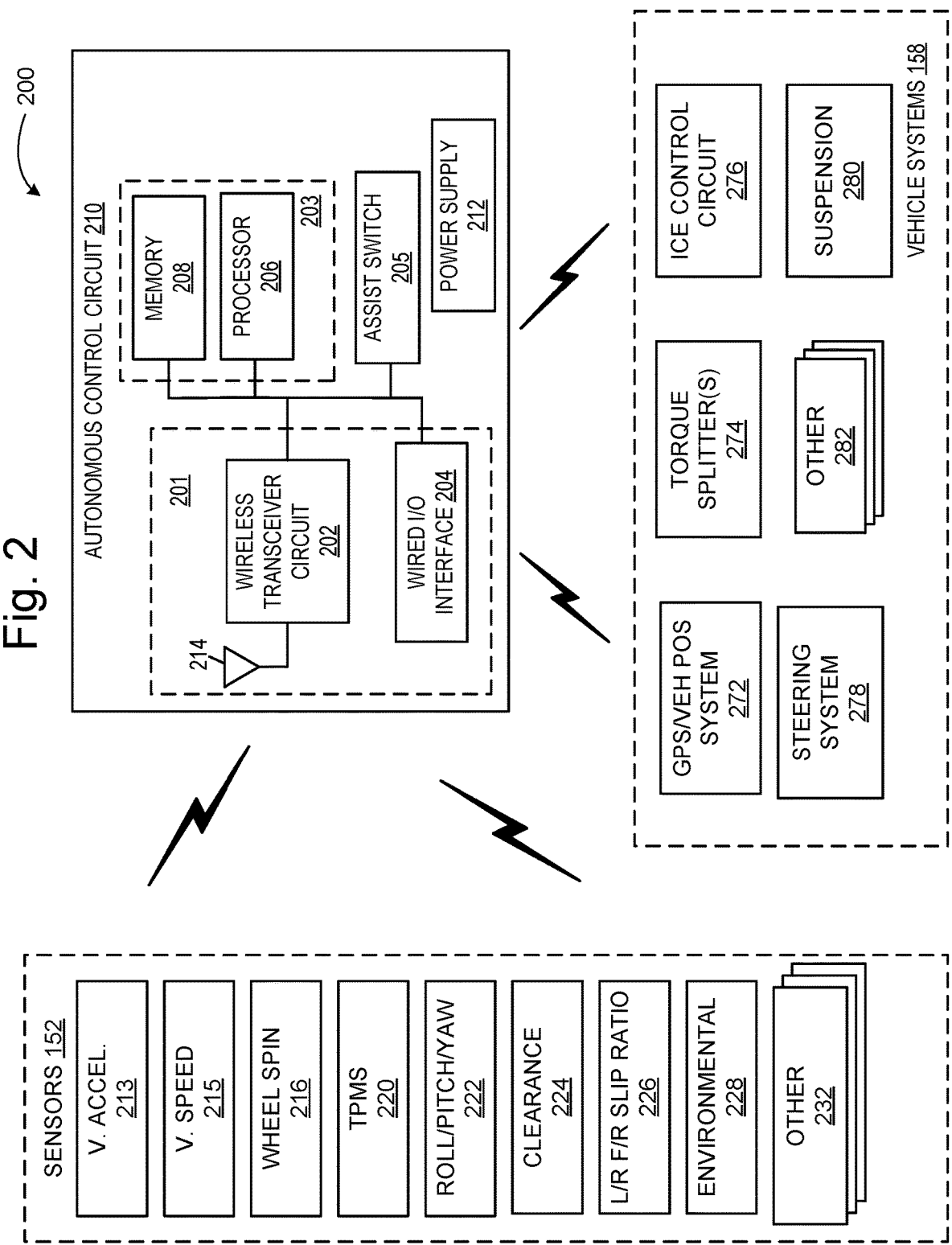
FIG. 2 illustrates an example architecture for autonomously controlling a vehicle in a semi-autonomous mode and a fully autonomous mode, in accordance with one embodiment of the systems and methods described herein

FIG. 2 illustrates an example architecture for autonomously controlling a vehicle in a semi-autonomous mode and a fully autonomous mode, in accordance with one embodiment of the systems and methods described herein. Referring now to FIG. 2, in this example, autonomous driving system 200 includes an autonomous driving circuit 210, a plurality of sensors 152, and a plurality of vehicle systems 158. Sensors 152 and vehicle systems 158 can communicate with autonomous driving circuit 210 via a wired or wireless communication interface. Although sensors 152 and vehicle systems 158 are depicted as communicating with autonomous driving circuit 210, they can also communicate with each other as well as with other vehicle systems. Autonomous driving circuit 210 can be implemented as an ECU or as part of an ECU such as, for example electronic control unit 50. In other embodiments, autonomous driving circuit 210 can be implemented independently of an ECU.

Autonomous driving circuit 210 in this example includes a communication circuit 201, a decision circuit (including a processor 206 and memory 208 in this example) and a power supply 212. Components of autonomous driving circuit 210 are illustrated as communicating with each other via a data bus, although other communication in interfaces can be included. Autonomous driving circuit 210 in this example also includes a manual assist switch 205 that can be operated by the driver to manually switch between a semi-autonomous and a fully autonomous driving mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to autonomous driving circuit 210. As will be described below, driving preferences and driving tendencies associated with a driver of vehicle 10 may be stored in memory 208. Accordingly, this stored information may be used to predict future human driving commands.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up autonomous driving circuit 210.

Communication circuit 201 may include either or both of a wireless transceiver circuit 202 with an associated antenna 214 and a wired I/O interface 204 with an associated hardwired data port (not illustrated). As this example illustrates, communications with autonomous driving circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by autonomous driving circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

In some embodiments autonomous driving circuit 210 may use V2X communication to communicate with other vehicles (V2V communications) or roadside units of a vehicle-to-infrastructure (V2I) communications system (both referred to as V2X communications). These communications can be received directly by autonomous driving circuit 210, another electronic control unit, or other communications components of vehicle 10 (and forwarded to autonomous driving circuit 210 via communication circuit 201).

Power supply 212 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which autonomous control system 200 is implemented. In the illustrated example, sensors 152 include vehicle acceleration sensors 213, vehicle speed sensors 215, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of autonomous control system 200. For example, there may be additional sensors for detecting and/or computing sideslip velocities, sideslip angles, percent sideslip, frictional forces, degree of steer, heading, and trajectory. Additionally, there may be sensors for detecting and/or computing front tire slip angle corresponding to full tire saturation, rear tire slip angle corresponding to full tire saturation, maximum stable steering angle given speed/friction, coefficient of friction between vehicle 10 tires and roadway, etc. As alluded to above, there may also be sensors for total lateral force, rear lateral force, front lateral force, longitudinal speed, lateral speed, longitudinal acceleration, brake engagement, steering wheel position, time derivatives of steering wheel position, throttle, time derivatives of throttle, etc.

Additional sensors 232 may also include sensors which obtain information related to the contextual environment in which vehicle 10 is operating. For example, as alluded to above, additional sensors 232 may include imaging sensors (such as cameras), and proximity sensors (such as radar, lidar, and sonar) which may be used to detect the movement and location objects, such as vehicles and pedestrians. For example, these imaging and proximity sensors may detect and compute the speed, acceleration, heading, and location of other vehicles and pedestrians. These sensors may also detect the operation of turn signals in other vehicles, the phase of traffic lights (i.e. green, yellow, red), traffic signs indicating a current speed limit, road curvature, road grade, obstacles, and so on.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the wheels such as, for example, by controlling front/rear and left/right torque split; engine control circuits 276 to control the operation of the engine (e.g. internal combustion engine 14); steering system 278 (which may be the steering by-wire system described in conjunction with FIG. 1) to turn the wheels of vehicle 10; suspension system 280 such as, for example, an adjustable-height air suspension system, and other vehicle systems. Vehicle systems 158 may also include the brake-by-wire system described in conjunction with FIG. 1.

During operation, autonomous driving circuit 210 can receive information from various vehicle sensors which can be used to determine what autonomous driving command to take. Communication circuit 201 can be used to transmit and receive information between autonomous driving circuit 210 and sensors 152, and autonomous driving circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 which autonomous driving circuit 210 may use to determine which autonomous driving command to take. Additionally, communication circuit 201 can be used to send a control signal or other control information to various vehicle systems 158 as part of executing the autonomous driving command. For example, communication circuit 201 can be used to send signals to, for example, one or more of: torque splitters 274 to control front/rear torque split and left/right torque split; ICE control circuit 276 to, for example, control motor torque, motor speed of the various motors in the system; and steering system 278 to, for example, increase lateral force. The decision regarding what action to take via these various vehicle systems 158 can be made based on the information detected by sensors 152. Examples of this are described in more detail below.

Figure 3:
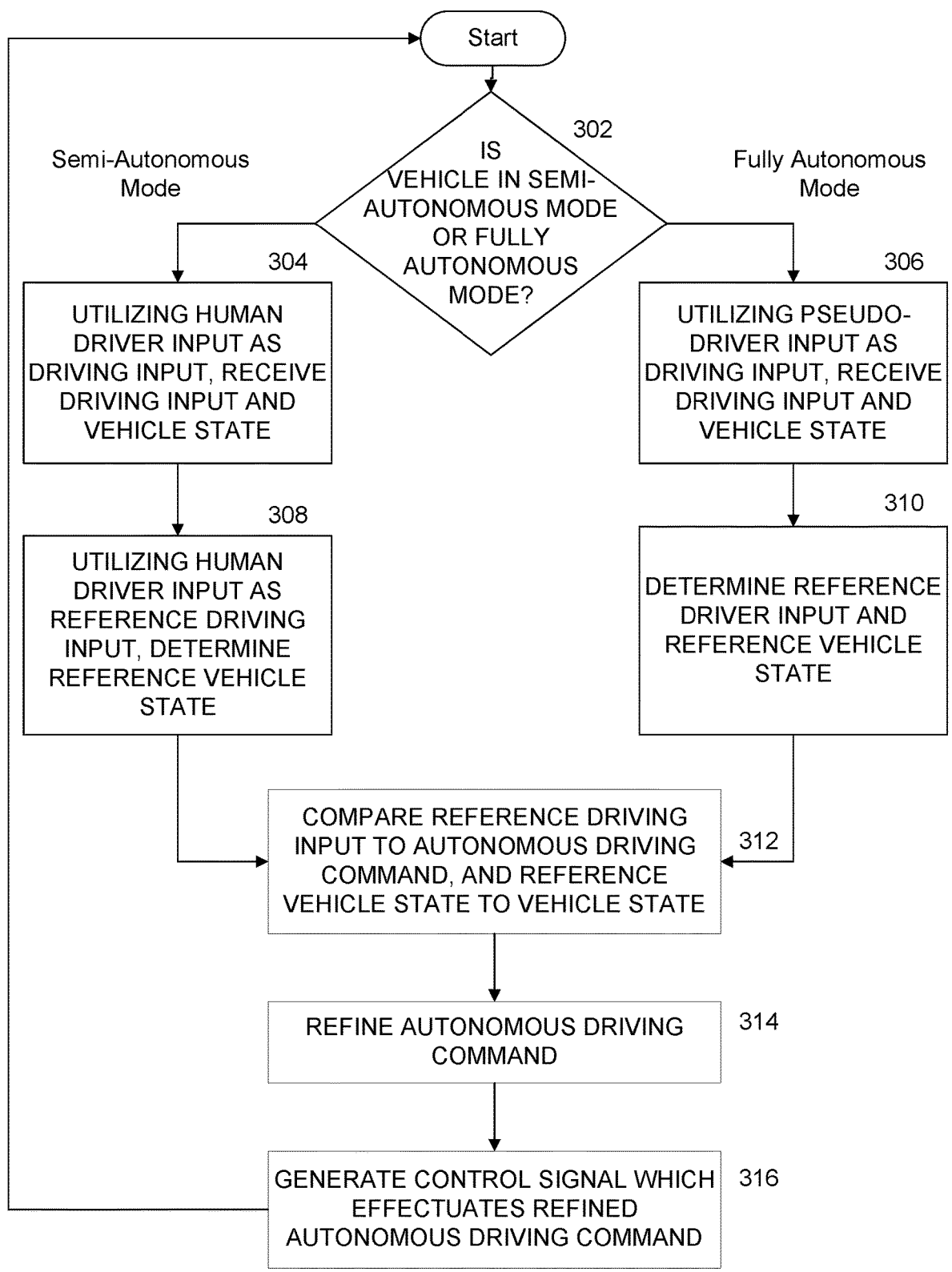
FIG. 3 is a flowchart illustrating example operations that can be performed to control a vehicle in a semi-autonomous and a fully autonomous driving mode, in accordance with one embodiment of the systems and methods described herein

FIG. 3 is a flowchart illustrating example operations that can be performed to control a vehicle in a semi-autonomous and a fully autonomous driving mode. In some embodiments, these operations may be performed by autonomous driving circuit 210.

At operation 302, an autonomous driving system in a vehicle determines whether the vehicle is operating in a semi-autonomous or a fully autonomous driving mode. In determining which mode the vehicle is in, the autonomous driving system may consider any one of a number of different inputs. For example, the autonomous driving system may allow for a driver of the vehicle to indicate whether they would like the vehicle to be in a fully autonomous mode or semi-autonomous mode. Additionally or alternatively, the autonomous driving system may be able to monitor sensors, such as sensors 152, to determine if the vehicle should be in an fully autonomous mode or a semi-autonomous mode.

If it is determined at operation 302 that the vehicle is operating in a semi-autonomous mode, the method proceeds to operation 304. At operation 304, utilizing human driver input as the driving input, the autonomous driving system receives a driving input and a vehicle state.

The human driver input may include at least one current human driver command. The current human driver command may be a command the human driver places on one or more vehicle systems, such as the steering, throttle and braking systems of the vehicle. For example, a current human driver command may be a lateral force/steering command placed on the steering system of the vehicle. The human driver input may also comprise predicted human driver commands along a defined time horizon. In some embodiments, the autonomous driving system may predict these human driver commands based on such information as a sequence of recent human driver commands, vehicle state (e.g. vehicle speed, heading, trajectory, etc.), the contextual environment in which the vehicle is operating (e.g. curvature of a road, boundaries of a lane line, relative location/movement of other vehicles on the road etc.), and past human driver tendencies/preferences (which may be stored in memory). An incentive may be provided for tracking the current human driver command. In certain embodiments, machine learning may be used to predict human driver commands. In some embodiments, the predicted human driver commands may be limited based on the physical constraints of vehicle actuators.

The vehicle state may comprise data associated with one or more operational state variables of a vehicle. For example, vehicle state may comprise data associated with operational state variables such as vehicle speed, vehicle acceleration, heading, and trajectory. Vehicle state may include other operational state variables such as lateral force, yaw rate, sideslip angle, heading error with respect to a reference trajectory, lateral bound error with respect to a reference trajectory, etc. In some embodiments, the autonomous driving system may obtain this data from sensors 152 and GPS/VEH Position System 272.

Like driving input, the vehicle state may be comprised of a current/measured vehicle state and one or more predicted vehicle states for a defined time horizon. These predicted vehicle states may be computed based on such information as current vehicle state, driving inputs (current and predicted), and data associated with the contextual environment in which the vehicle operates. This contextual data may include information related to road features (e.g. road path, lane boundaries, bank angle etc.), location/movement data associated with objects in the vehicle's proximity (e.g. other vehicles, fallen trees, deer, etc.), traffic signs/signals, and ambient weather conditions. In some embodiments, the autonomous driving system may obtain contextual data from sensors 152 and GPS/VEH Position System 272.

If it is determined at operation 302 that the vehicle is operating in a fully autonomous mode, the method proceeds to operation 306. At operation 306, utilizing pseudo-driver input as the driving input, the autonomous driving system receives a driving input and a vehicle state.

A pseudo-driver input may be provided by an electronic control unit in the vehicle. For example, in some embodiments the pseudo-driving input may be provided by a proportional-integral-derivative (PID) controller. In some embodiments, the electronic control unit which provides the pseudo-driver input may be trained by machine learning.

The pseudo-driver input may be generated by any one of a number of different algorithms. For example, as will be described in greater detail in conjunction with FIG. 4, an algorithm used to generate the pseudo-driver input may utilize a lookahead feedback scheme and a feedforward algorithm based on a nonlinear vehicle-handling diagram. In some embodiments, the feedforward algorithm may incorporate a desired sideslip behavior.

Like the human driver input, the pseudo-driver input may comprise one or more predicted pseudo-driver commands for a defined time horizon. These predicted pseudo-driver commands may be determined as described in conjunction with FIG. 4.

As alluded to above, the vehicle state may comprise data associated with one or more operational state variables of a vehicle. The vehicle state of operation 306 may be the same/similar as the vehicle state of operation 304.

At operation 308, utilizing the human driver input as the reference driving input, the autonomous driving system determines a reference vehicle state.

In a semi-autonomous mode, the reference driving input may be the same as the human driver input. For example, a human driving input may comprise a lateral force command, $F_{yf,driver}(k)$, and a change in lateral force command, $\Delta F_{yf,driver}(k)$. As illustrated below, when operating in a semi-autonomous mode, the human driver input may be the same as the reference driving input, $u_{ref}(k)$. Here, $F_{yf,ref}(k)$ may represent a lateral force command for the reference driving input $u_{ref}(k)$, and $\Delta F_{yf,ref}(k)$ may represent a change in lateral force command for the reference driving input $u_{ref}(k)$.

$$u_{ref}(k)=[F_{yf,ref}(k),\Delta F_{yf,ref}(k)]^T=[F_{yf,driver}(k),\Delta F_{y,driver}(k)]^T$$

Accordingly, in the semi-autonomous mode, only the reference vehicle state, $x_{ref}(k)$, may need to be computed. $x_{ref}(k)$ may be computed using the example steady state computation below.

$$x_{ref}(k)=A_{disc}x_{ref}(k)+B1_{disc}u_{ref}(k)+B3_{disc}\nabla k\in[1,N]$$

Here, $x_{ref}(k)$ is a vector which represents the reference vehicle state and $u_{ref}(k)$ is a vector which represents the reference driving input. $A_{disc}$, $B1_{disc}$, and $B3_{disc}$ may represent weighting parameters/constants. In embodiments where $u_{ref}(k)$ is the human driver input in the semi-autonomous mode, there is no need to set another variable to a constant value. As will be described below, this may not be the case when the vehicle is operating in a fully autonomous mode.

$x_{ref}(k)$ may also be computed using a continuous time vehicle dynamics model. For example if the time derivative of vehicle state is a function of vehicle state and driving input, i.e. $\dot{x}=f(x_{ref}, u_{ref})$, then the reference computation may be performed as follows:

$$0 = f(x_{ref}, u_{ref})$$

This non-linear equation may be solved using a method such as Newton's method or gradient descent.

At operation 310, the autonomous driving system determines a reference driving input and a reference vehicle state. It should be understood that because there is no human driver input in the fully autonomous mode, the reference driving input may need to be determined/computed.

For example, the reference driving input and reference vehicle state may be determined using a steady state computation. In particular, the reference driving input and reference vehicle state may be computed by solving the example system of equations illustrated below.

$$x_{ref}(k) = A_{disc} x_{ref}(k) + B1_{disc} u_{ref}(k) + B3_{disc} \forall k \in [1,N]$$

$$e_{ref} = 0$$

As alluded to above, $x_{ref}(k)$ is a vector which represents the reference vehicle state and $u_{ref}(k)$ is a vector which represents the reference driving input. $e_{ref}$, which is set to zero, represents a reference lateral bound error. Here, $e_{ref}$ is one of the dimensions of the reference vehicle state, $x_{ref}(k)$. By setting $e_{ref}$ to a constant value (which may be any number of constant values, including zero), the system of equations is fully specified, and $x_{ref}(k)$ and $u_{ref}(k)$ may be computed.

In other embodiments, when the vehicle is in a fully autonomous mode, the reference vehicle state and reference driving input may be computed using a continuous time vehicle time dynamics model. For example if the time derivative of vehicle state is a function of vehicle state and driving input, i.e. $\dot{x}=f(x_{ref}, u_{ref})$, then the reference computation may be performed as follows:

$$0 = f(x_{ref}, u_{ref})$$

$$e_{ref} = 0$$

This non-linear system of equations may be solved using a method such as Newton's method or gradient descent.

At operation 312, the autonomous driving system compares the reference driving input to an autonomous driving command, and the reference vehicle state to the vehicle state. In some embodiments the autonomous driving system may also compare the driving input to the autonomous driving command.

The autonomous driving command may be the autonomous driving command(s) which the autonomous driving system determines to take for a defined time horizon. An autonomous driving command may be a command that the autonomous driving system places on one or more vehicle systems, such as the steering, throttle and braking systems of the vehicle. For example, the autonomous driving command may be a lateral force command placed on the steering system of the vehicle. Like the driving input, the autonomous driving command may be comprised of a current autonomous driving command, and one or more predicted autonomous driving commands. In this way, reference/desired outputs of the system may be compared to current and predicted outputs of the system (i.e. current/predicted autonomous driving commands and current/predicted vehicle states) for a defined time horizon. Accordingly, the current/predicted outputs may be driven towards the reference values.

In certain embodiments, these comparisons may be formulated as terms in an objective cost function, such as the cost function illustrated below.

$$\min_x \sum_{k=1}^{N}(x_s(k) - x_{ref}(k))^T Q(x_s(k) - x_{ref}(k)) + \sum_{k=1}^{N} u(k) -$$

$$u_{ref}(k))^T R(u(k) - u_{ref}(k)) + \sum_{k=1}^{N} WS(k) + \sum_{k=1}^{N} \gamma |F_{yf,driver,pred} - F_{yf}(k)|$$

s.t. $x_s(k+1) = A_{disc}x_s(k) + B1_{disc}F_{yf}(k) + B3_{disc}$
$F_{yf}(k+1) = F_{yf}(k) + \Delta F_{yf}(k+1)$
$x_s(1) = x_{s,meas}$
$F_{yf}(1) = F_{yf,command} + \Delta F_{yf}(1)$
$u_{min}(k) \leq u(k) \leq u_{max}(k)$
$S_{driver}(k) \geq \pm(F_{yf,driver,pred}(k) - F_{yf}(k))$
$S(k) \geq 0$
$H_{veh}(k)x(k) \leq G_{veh}(k) + S_{veh}(k)$
$H_{env}(k)x(k) \leq G_{env}(k) + S_{lat}(k)$ where $x_s(k) = [\beta(k)\ r(k)\ \Delta\varphi(k)\ e(k)]^T$
$u(k) = [F_{yf}(k)\ \Delta F_{yf}(k)]^T$
$S(k) = [S_{veh}(k)\ S_{driver}(k)]^T$
$x_{ref}(k) = [\beta_{ref}(k)\ r_{ref}(k)\Delta\varphi_{ref}(k)\ e_{ref}(k)]^T$
$u_{ref}(k) = [F_{yfref}(k)\ \Delta F_{yfref}(k)]^T$ The first summation in the cost function compares the vehicle state to the reference vehicle state. In particular, $x_s(k)$ is a vector which represents the vehicle state for particular steps along a defined time horizon. As alluded to above, $x_s(k)$ may be predicted for time steps beyond the measured/current time step at k=1. $x_s(k)$ may be n-dimensional, where each dimension represents a different operational state variable for the vehicle (e.g. yaw rate, sideslip angle, heading, heading error with respect to a trajectory, lateral bound error with respect to a trajectory, etc.). $x_{ref}(k)$ is a vector which represents the reference vehicle state. Like $x_s(k)$, $x_{ref}(k)$ may be n-dimensional, and in some embodiments, may represent the same operational state variables as $x_s(k)$. Q may represent a tunable weighting parameter.

The second summation in the cost function compares the autonomous driving command to the reference driving input. In particular, u(k) is a vector which represents the autonomous driving command for particular steps along a defined time horizon. The vector u(k) may be n-dimensional, where each dimension represents a different parameter of an autonomous driving command, such as lateral force (effectuated through steering angle), change in lateral force, throttle, braking, etc. $u_{ref}(k)$ is a vector which represents the reference driving input. Like, u(k), $u_{ref}(k)$ may be n-dimensional, and in some embodiments, may represent the same driving command/input parameters as the vector u(k). R may represent a tunable weighting parameter.

The third summation in the cost function contains a slack vector, S(k). The purpose of the third summation in the cost function is to allow excursions from an envelope (here, an envelope may refer to the boundaries and limits within which a vehicle is estimated to remain stable) if necessary. For example, the slack vector S(k) may allow a human driver (during a semi-autonomous mode) or the autonomous driving system (during either of the semi-autonomous or fully autonomous modes) to drive off the road to avoid a collision. However, it should be understood that the third summation also punishes such deviations. Put another way, the third summation may be minimized by driving the slack vector S(k) to zero. W may represent a tunable weighting parameter.

The fourth summation in the cost function compares the driving input (either a human driver input or a pseudo-driver input) to the autonomous driving command. In particular, in the illustrated cost function, $F_{yf}(k)$ is the autonomous driving command expressed as a lateral force command, and $F_{yf,driver,pred}(k)$ is the driving input expressed as a lateral force command. As alluded to earlier, $F_{yf,driver,pred}(k)$ will represent a human driver input during a semi-autonomous mode, and a pseudo-driver input during a fully autonomous mode. The importance of vector $F_{yf,driver,pred}(k)$ in the illustrated cost function should be understood. The fact that $F_{yf,driver,pred}(k)$ may represent both a human driver input and a pseudo-driver input is what allows embodiments of the presently disclosed technology to use a common control scheme/cost function during the semi-autonomous and fully autonomous modes. γ may represent a tunable weighting parameter.

As alluded to above, during a semi-autonomous mode, $F_{yf,driver,pred}(k)$ may comprise a human driver command for a current time step (i.e. k=1), and a set of predicted human driver commands for future time steps (i.e. k>1). Similarly, while in a fully autonomous driving mode, $F_{yf,driver,pred}(k)$ may comprise one or more predicted pseudo-driver commands.

Finally, the illustrated cost function may be subject to one or more constraints. A number of example constraints which may be applied to the cost function are illustrated below the cost function.

Of note, the first constraint illustrates a relationship between a prior vehicle state, $x_s(k)$, the autonomous driving command (expressed as a lateral force command), $F_{yf}(k)$, and a future vehicle state $x_s(k+1)$. By this relationship, the autonomous driving command which the autonomous driving system determines to take modulates the first summation in the cost function. Likewise, the fifth constraint illustrates a relationship between the slack vector S(k), and $F_{yf}(k)$. By this relationship, the autonomous driving command which the autonomous driving system determines to take modulates the third summation. In this way, the autonomous driving command which the autonomous driving system determines to take, i.e. u(k) or $F_{yf}(k)$, is present in each summation of the cost function. Other parameters referenced above may be defined as follows. $H_{veh}(k)$ may represent a vehicle envelope constraint. The vehicle envelope constraint (i.e., $H_{veh}(k)$) may define a region of stable vehicle states. $G_{veh}(k)$ may comprise a vector that represents a vehicle envelope, and $S_{veh}(k)$ may represent a corresponding slack vector for vehicle envelope. $H_{env}(k)$ may represent an environmental envelope constraint, such as the boundaries of a lane line. $G_{env}(k)$ may comprise a vector that represents an environment envelope, and an $S_{lat}(k)$ may represent a corresponding slack vector for environmental envelope. $β_{ref}(k)$ may represent a sideslip component of the reference vehicle state (i.e., $x_{ref}(k)$). $r_{ref}(k)$ may represent a yaw rate component of the reference vehicle state (i.e., $x_{ref}(k)$). $Δφ_{ref}(k)$ may represent a heading component (e.g., with respect to a "z" trajectory) of the reference vehicle state (i.e., $x_{ref}(k)$). $e_{ref}(k)$ may represent a lateral bound component (e.g., with respect to the "z" trajectory) of the reference vehicle state (i.e., $x_{ref}(k)$).

At operation 314, the autonomous driving system refines the autonomous driving command, based in part on the comparisons described in conjunction with operation 312. For example, in some embodiments the autonomous driving command may be refined by computing an autonomous driving command which minimizes/reduces an objective cost function, such as the cost function illustrated above. For example, the autonomous driving command may be refined by computing the vectors for u(k) and $F_{yf}(k)$ which minimize the cost function. As described above, the refined autonomous driving command may be n-dimensional, where each dimension represents a different parameter of driving command/input.

At operation 316, the autonomous driving system generates one or more control signals which effectuate the refined autonomous driving command. The generated control signals may include instructions to maintain a given lateral force, change lateral force, increase/decrease speed, etc. These control signals may be sent to one or more vehicle systems as described in conjunction with FIGS. 1 and 2. For example, signals which relate to a change in lateral force may be sent to the steering-by-wire system of vehicle 10.

Figure 4:
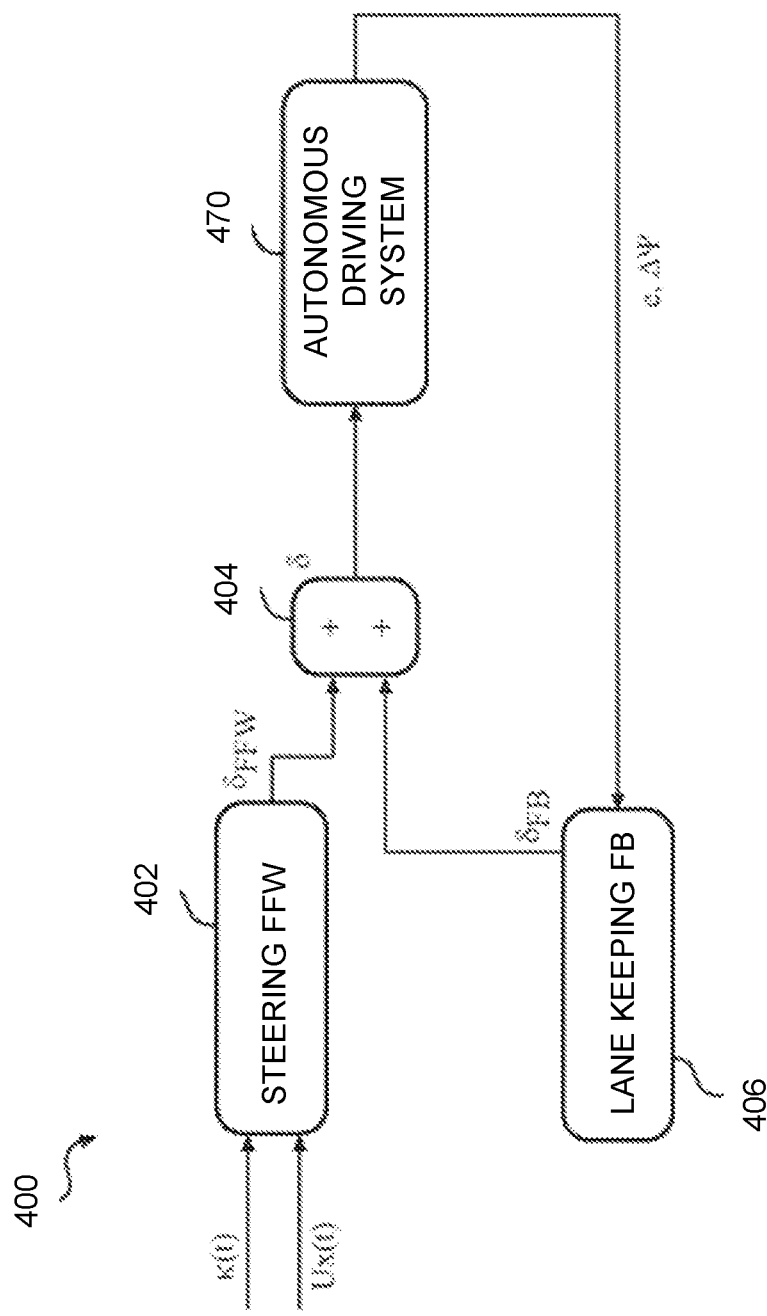
FIG. 4 is flowchart illustrating an example process which may be used to generate a pseudo-driver input.

FIG. 4 is flowchart illustrating an example process which may be used to generate a pseudo-driver input. As stated previously, any one of a number of different algorithms may be utilized to generate the pseudo-driver input. In this example, a steering feedforward module 402 receives as inputs a current path curvature k and forward velocity Ux. The steering feedforward module 402 outputs a feedforward steering angle $δ_{FFW}$ based on these inputs. A lane keeping feedback module 406 outputs a feedback steering angle $δ_{FB}$ based on the lateral bound error, e, of vehicle 10 and path heading error Δψ. In this example, the pseudo-driver input δ is the sum of the feedback and feedforward inputs and is provided to the autonomous driving system 470.

Figure 5:
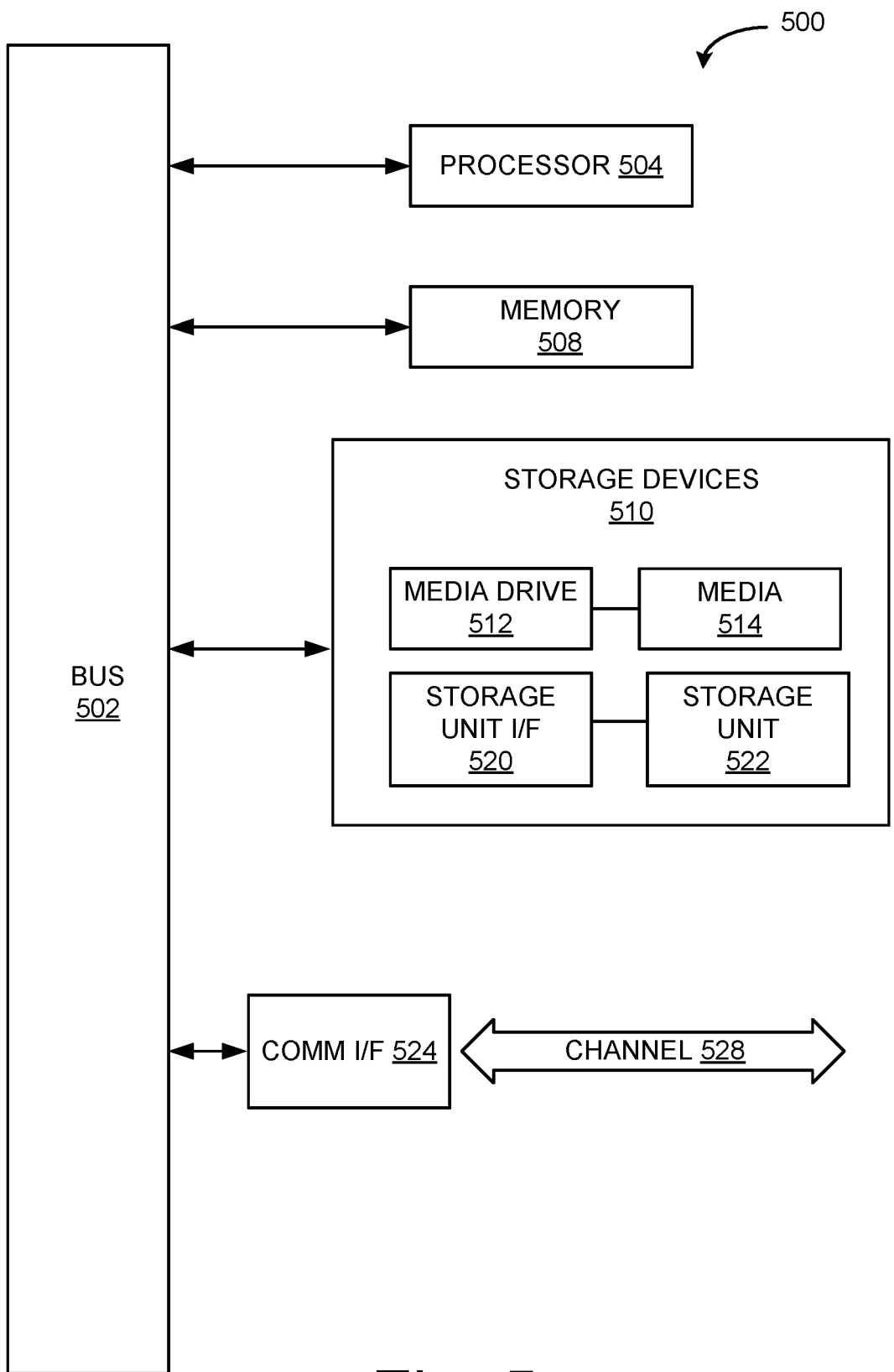
FIG. 5 depicts an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle having a semi-autonomous and a fully autonomous driving mode, the vehicle comprising:
    one or more processors configured to execute machine executable instructions in non-transitory memory to:
        in response to receiving a driving input and a vehicle state for a defined time horizon, determine a reference driving input and a reference vehicle state for the defined time horizon, wherein the driving input is a human driver input when the vehicle is operating in a semi-autonomous mode and a pseudo-driver input when the vehicle is operating in a fully autonomous mode;
        compare the driving input and the reference driving input to an autonomous driving command and the reference vehicle state to the vehicle state;
        compute a second autonomous driving command based on the comparing; and
        generate a control signal which effectuates the second autonomous driving command.

2. The vehicle of claim 1, wherein:
    comparing the reference driving input to the autonomous driving command comprises comparing the reference driving input to the autonomous driving command within a first term of an objective cost function;
    comparing the driving input to the autonomous driving command comprises comparing the driving input to the autonomous driving command within a second term of the objective cost function;
    comparing the reference vehicle state to the vehicle state comprises comparing the reference vehicle state to the vehicle state within a third term of the objective cost function; and
    the second autonomous driving command reduces the objective cost function.

3. The vehicle of claim 2, wherein the objective cost function further comprises a fourth term containing a slack variable.

4. The vehicle of claim 1, wherein the vehicle state comprises a data associated with the current operational state of the vehicle.

5. The vehicle of claim 4, wherein the vehicle state further comprises one or more data associated with predicted future operational states of the vehicle.

6. The vehicle of claim 1, wherein:
    the human driver input comprises a current human driver command and one or more predicted human driver commands for the defined time horizon; and
    the pseudo-driver input comprises one or more predicted pseudo-driver commands for the defined time horizon.

7. The vehicle of claim 6, wherein the current human driver command comprises one or more commands a human driver in the vehicle places on one or more motive systems of the vehicle.

8. The vehicle of claim 7, wherein the current human driver command comprises a lateral force command placed on the steering system of the vehicle.

9. The vehicle of claim 1, wherein the pseudo-driver input is a stabilizing prediction steering command.

10. The vehicle of claim 9, wherein the stabilizing prediction steering command is a stable lane keeping feedforward command.

11. A vehicle having a semi-autonomous and a fully autonomous driving mode, the vehicle comprising:
    one or more processors; and
    memory operatively connected to the one or more processors and including computer code, that when executed by the one or more processors, causes the vehicle to:
        in response to receiving a driving input for a defined time horizon, determine a reference driving input for the defined time horizon, wherein the driving input is a human driver input when the vehicle is operating in a semi-autonomous mode and a pseudo-driver input when the vehicle is operating in a fully autonomous mode;
        compare the reference driving input to an autonomous driving command;
        compute a second autonomous driving command based on the comparing; and
        generate a control signal which effectuates the second autonomous driving command.

12. The vehicle of claim 11, wherein:
    comparing the reference driving input to the autonomous driving command comprises comparing the reference driving input to the autonomous driving command within a term of an objective cost function; and
    the second autonomous driving command reduces the objective cost function.

13. The vehicle of claim 12, wherein:
    the human driver input comprises a current human driver command and one or more predicted human driver commands for the defined time horizon; and
    the pseudo-driver input comprises one or more predicted pseudo-driver commands for the defined time horizon.

14. The vehicle of claim 13, wherein the current human driver command comprises one or more commands a human driver in the vehicle places on one or more motive systems of the vehicle.

15. The vehicle of claim 14, wherein the current human driver command comprises a lateral force command placed on a steering system of the vehicle.

16. The vehicle of claim 12, wherein the pseudo-driver input is a stabilizing prediction steering command.

17. The vehicle of claim 16, wherein the stabilizing prediction steering command is a stable lane keeping feed-forward command.

18. A method for controlling a vehicle having a semi-autonomous mode and a fully autonomous mode, the method comprising:
- in response to receiving a driving input and a vehicle state for a defined time horizon, determining a reference driving input and a reference vehicle state for the defined time horizon, wherein the driving input is a human driver input when the vehicle is operating in a semi-autonomous mode and a pseudo-driver input when the vehicle is operating in a fully autonomous mode;
- comparing the reference driving input to an autonomous driving command and the reference vehicle state to the vehicle state;
- computing a second autonomous driving command based on the comparing; and
- generating a control signal which effectuates the second autonomous driving command.

19. The method of claim 8, wherein:
- comparing the reference driving input to the autonomous driving command comprises comparing the reference driving input to the autonomous driving command within a first term of an objective cost function;
- comparing the reference vehicle state to the vehicle state comprises comparing the reference vehicle state to the vehicle state within a second term of the objective cost function; and
- the second autonomous driving command reduces the objective cost function.

20. The method of claim 19, wherein the reference driver input is the human driver input when the vehicle is in the semi-autonomous mode.

* * * * *